(No Model.)
W. J. HAMILTON.
GATE.
No. 291,724. Patented Jan. 8, 1884.
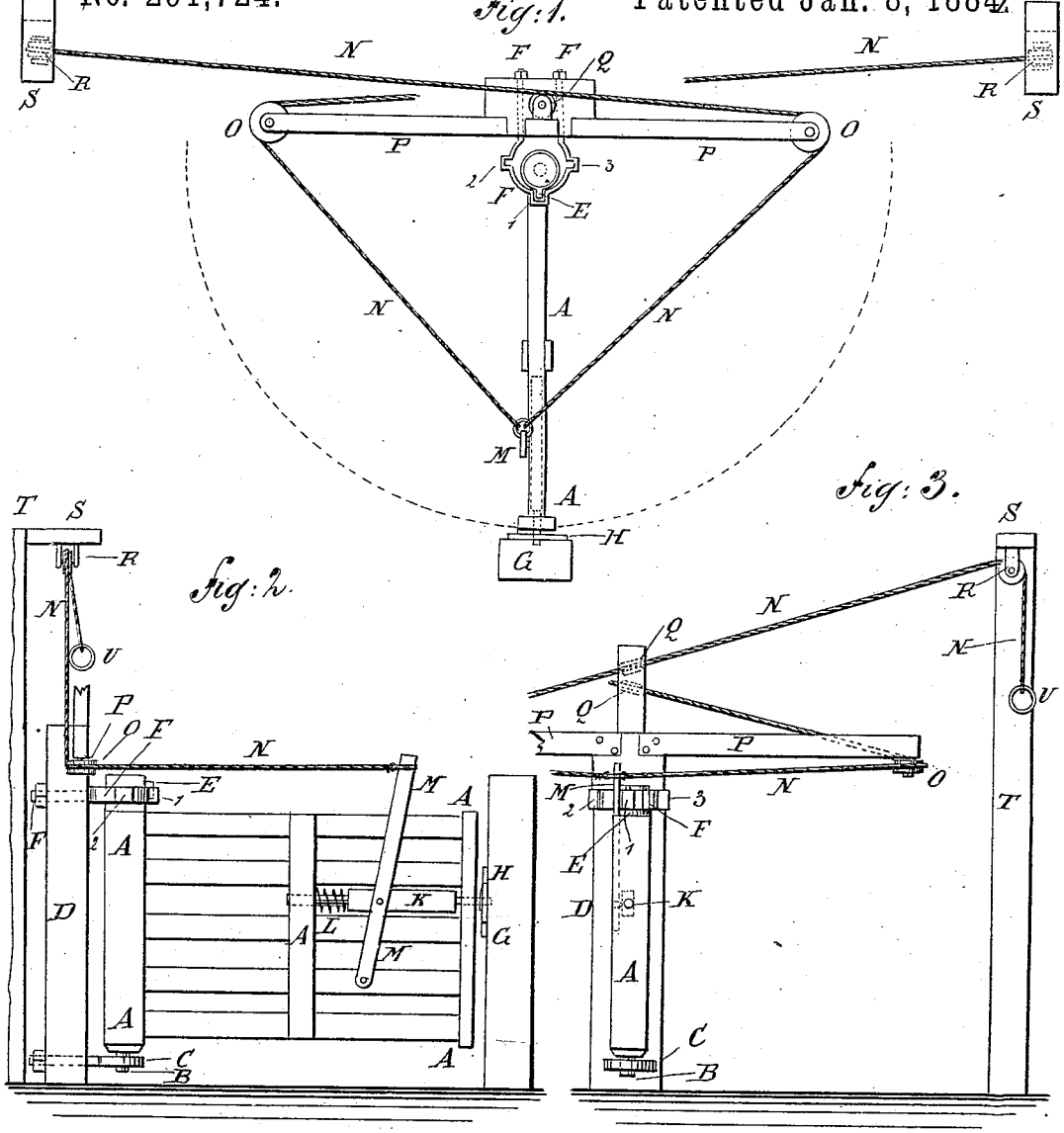
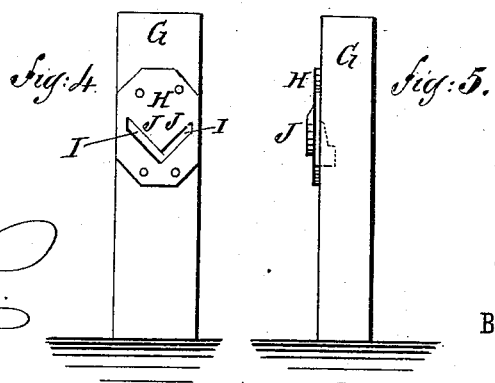
WITNESSES:
Chas. Nida
C. Sidgwick
INVENTOR:
W. J. Hamilton
BY Munn & Co.
ATTORNEYS.

UNITED STATES PATENT OFFICE.

WILLIAM JAMES HAMILTON, OF NEW BOSTON, IOWA.

GATE.

SPECIFICATION forming part of Letters Patent No. 291,724, dated January 8, 1884.

Application filed April 11, 1883. (No model.)

*To all whom it may concern:*

Be it known that I, WILLIAM JAMES HAMILTON, of New Boston, in the county of Lee and State of Iowa, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a side elevation of the same. Fig. 3 is a front elevation of the same, the latch-post being omitted and part being broken away. Fig. 4 is a front elevation of the latch-post. Fig. 5 is a side elevation of the same.

The object of this invention is to facilitate the opening and closing of gates and promote security and durability in the use of said gates.

The invention relates to a gate constructed with a pivot, and a socket-plate at the lower corner, and a recessed bar and tooth at the upper corner of its rear end for connecting the gate with the rear post and fastening it, both when shut and when open. The gate is fastened at its forward end, when shut, by a spring-pressed bolt engaging with a catch-plate attached to the front post, and provided with an angular slot having a flange along its inner edge. The gate is unfastened and swung open or shut by means of a pivoted bar connected with a bolt, and ropes passing around guide-pulleys pivoted to arms attached to the rear post and to side post, as will be hereinafter fully described.

A represents a gate of any ordinary construction. The lower end of the rear upright of the gate A is beveled, and has a pivot, B, formed upon or attached to it, which pivot works in a socket in a plate, C. The plate C has a bolt formed upon its rear edge, which passes through the rear or hinge post, D, and has a nut screwed upon its end at the rear side of the said post. The upper end of the rear upright of the gate A is made round, and has a tooth or projection, E, formed upon or attached to its forward side. The upper end of the rear upright of the gate A is surrounded by a bar, F, the middle part of which is bent into circular form, and has recesses 1 2 3 formed in its inner side, the recess 1 being in line with the gateway, and the recesses 2 3 being at right angles with the said gateway, as shown in Fig. 1. The recesses 1 2 3 are designed to receive the tooth E and hold the gate in place when closed, or when opened to either side. The ends of the bar F pass through the post D, and have nuts screwed upon them.

G is the forward or latch post, to the inner side of which is attached a plate, H, having an angular or curved slot, I, formed in it, with a flange, J, along its inner edge, the said slot being designed to receive the fastening-bolt K in a recess formed at the vertex of the angle made by the slot, and considerably deeper than the slot, as shown in dotted lines in Fig. 5 of the drawings, and the flange J being designed to serve as a stop and guide to the end of the said bolt as the gate swings shut. The ends of the bolt K slide in bearings in or between the upright bars of the gate A, and it is held forward to engage with the catch-plate H by a spiral spring, L, placed upon the rear part of the bolt, and interposed between a shoulder of the said bolt and the upright bar, in which the said rear end of the bolt slides.

To the middle part of the bolt K is pivoted a bar, M, the lower end of which is pivoted to a bar of the gate A. Its upper end projects above the said gate, and to it are attached the ends of two ropes, N. The ropes N pass around guide-pulleys O, pivoted to the outer ends of two arms, P, the inner ends of which are mortised or otherwise secured to the post D. The ropes N cross each other at the rear side of the post D, and are kept in place and from contact with each other by guide-pulleys Q, pivoted to supports attached to the said post, around which the said ropes pass. From the pulleys Q the ropes N pass to and over pulleys R, pivoted to supports attached to the lower sides of arms S, which project from the upper ends of posts T, set in the ground at suitable distances from the rear post, D. The ropes N have rings U or other handles attached to their free ends, which should have sufficient gravity to keep the said ropes taut. With this construction, when the free end of either of the ropes N is drawn upon, the upper end of the bar M is drawn back, withdrawing the bolt K from the catch-plate H. As the pull upon the rope N is continued the forward end of the gate is raised, withdrawing the tooth E from the forward recess, 1, of the bar F, and releasing the gate so that the strain upon the said rope N will swing the gate open in the direction from the operator. As the gate A comes into a position at right angles with its former position, the tooth E drops into one of the sockets 2 3, and the gate is fastened open. After the operator has passed through the gateway he pulls upon the other rope N, which raises the forward end of the gate, and withdraws the tooth E from the recess in the bar F. The traveler continues to pull on the string, so as to keep the gate raised at its front, and the spring-latch held back until the gate is between the posts. Now letting go the cord, the latch is shot out by its spring, and the gate-front drops so as to let down the latch into the vertex of the slot I.

I am aware that it is not new to raise perpendicularly a gate-latch and to swing the gate open by cords or ropes passing over pulleys and brought within reach of the traveler, mechanism being used to connect these ropes or cords with the gate and its latch; but What I do claim as new and of my invention is—

The combination, with a horizontal sliding spring-pressed gate-bolt, K, of the stationary post-plate H, having the slot I, and along its inner edge the flange J, adapted to receive, guide, and stop said bolt, as described.

WILLIAM JAMES HAMILTON.

Witnesses:
AL. S. HICKMAN,
F. P. ANDERSON.